United States Patent
Fox-Mudge

(10) Patent No.: US 12,173,741 B2
(45) Date of Patent: Dec. 24, 2024

(54) SELF TIGHTENING NUT AND BOLT SYSTEM

(71) Applicant: Brady Fox-Mudge, Pollock Pines, CA (US)

(72) Inventor: Brady Fox-Mudge, Pollock Pines, CA (US)

(73) Assignee: Brady Fox-Mudge, Pollock Pines, CA (US)

( * ) Notice: Subject to any disclaimer, the term of this patent is extended or adjusted under 35 U.S.C. 154(b) by 300 days.

(21) Appl. No.: 17/330,379

(22) Filed: May 25, 2021

(65) Prior Publication Data

US 2022/0381282 A1    Dec. 1, 2022

(51) Int. Cl.
*F16B 31/04* (2006.01)
*F16B 37/08* (2006.01)
*F16H 25/20* (2006.01)

(52) U.S. Cl.
CPC .......... *F16B 31/04* (2013.01); *F16B 37/0807* (2013.01); *F16H 25/2025* (2013.01); *F16H 2025/2062* (2013.01)

(58) Field of Classification Search
CPC .......... F16B 31/04; F16B 37/00; F16B 35/00; F16H 2025/2062
USPC .......................................... 411/349, 432, 383
See application file for complete search history.

(56) References Cited

U.S. PATENT DOCUMENTS

| | | | | |
|---|---|---|---|---|
| 1,542,467 A * | 6/1925 | Moratta | .................. | F16B 31/04 411/511 |
| 1,651,240 A * | 11/1927 | Anderson | ............... | F16B 31/04 411/350 |
| 3,546,506 A * | 12/1970 | Olson | .................. | F16H 25/2266 310/83 |
| 3,640,141 A * | 2/1972 | Hollingsead | ........ | F16H 25/2025 74/89.38 |
| 4,801,231 A * | 1/1989 | Everman | ............. | F16B 37/0807 411/289 |
| 4,920,816 A * | 5/1990 | Inabe | .................. | F16H 25/2025 192/93 C |
| 4,977,788 A * | 12/1990 | Besemann | ............... | B23Q 5/00 192/26 |
| 5,639,196 A * | 6/1997 | Murase | .................. | B62D 43/10 411/433 |
| 6,261,041 B1 * | 7/2001 | Nakamura | ............ | B24B 23/028 411/428 |
| 6,290,446 B1 * | 9/2001 | Warkotsch | .......... | F16B 37/0864 411/432 |
| 7,150,596 B2 * | 12/2006 | Diaz | ........................ | F16B 5/02 411/21 |
| 9,605,736 B1 * | 3/2017 | Foshage | ............. | F16H 37/0826 |
| 11,515,832 B2 * | 11/2022 | Taha | ....................... | F24S 25/70 |

(Continued)

*Primary Examiner* — William D Hutton, Jr.
*Assistant Examiner* — Dil K. Magar
(74) *Attorney, Agent, or Firm* — Perkins Coie LLP

(57) ABSTRACT

Provided in this disclosure is a self-tightening nut and bolt system. The nut and bolt system can be configured to provide a consistent level of tightness and torque to reliably attach two mechanical components together. The nut comes with a microcontroller, and a motorized thread, where the microcontroller controls the tightness of the nut. The microcontroller allows the nut's tightness to be monitored, and controlled over time. This prevents the nut from becoming loose, and allows certain levels of tightness to be controlled over time.

10 Claims, 7 Drawing Sheets

(56) References Cited

U.S. PATENT DOCUMENTS

| | | | |
|---|---|---|---|
| 2005/0028617 A1* | 2/2005 | Wells | F16H 25/2025 269/57 |
| 2006/0113933 A1* | 6/2006 | Blanding | H02K 7/116 318/116 |
| 2009/0250552 A1* | 10/2009 | Kearns | F16H 25/20 244/102 A |
| 2013/0019921 A1* | 1/2013 | Au | H02S 20/10 136/246 |
| 2014/0111133 A1* | 4/2014 | Pettey | H02K 7/06 310/68 B |
| 2015/0316639 A1* | 11/2015 | Russ | H02S 20/00 250/203.4 |
| 2016/0017966 A1* | 1/2016 | Wu | F16H 25/20 74/89.38 |
| 2016/0221197 A1* | 8/2016 | Claffee | B25J 9/102 |
| 2017/0107792 A1* | 4/2017 | Lee | E21B 34/066 |
| 2018/0029508 A1* | 2/2018 | Carl | B60N 2/366 |
| 2018/0073773 A1* | 3/2018 | Grushkowitz | F16D 9/00 |
| 2018/0172080 A1* | 6/2018 | Jackowski | B25J 9/1025 |
| 2018/0274641 A1* | 9/2018 | Kitamura | F16H 25/2223 |
| 2019/0376586 A1* | 12/2019 | Shimizu | F16H 25/24 |
| 2020/0049236 A1* | 2/2020 | Shimizu | F16H 37/12 |
| 2020/0072308 A1* | 3/2020 | Kocjan | B60T 17/083 |
| 2020/0271204 A1* | 8/2020 | Momose | F16H 25/2021 |

* cited by examiner

SELF TIGHTENING NUT AND BOLT SYSTEM

TECHNICAL FIELD

Various embodiments of the present disclosure generally relate to methods and systems for self-tightening nuts and bolts.

BACKGROUND

Typical mechanical systems, such as motors, are designed in separate pieces. These pieces are then affixed to each other via a nut and bolt attachment mechanism. One piece, the nut, has a thread that corresponds to the thread on the bolt.

An operator, or machine, would apply a certain torque to a nut on a bolt to affix two pieces together. The nut and bolt would need to be affixed to a certain tightness.

Nuts and bolts are used frequently in machinery that inherently vibrates, such as a motor. Over time, this vibration can cause the nuts to loosen. This can loosen the connections between pieces of a machine and, over time, the vibrations can cause significant damage. If unnoticed, something as simple as a loose nut can cause significant damage to a motor or other components that are very expensive.

What is needed is a system that prevents loose connections from occurring.

SUMMARY

This document relates to systems and methods for tightening and loosing nuts.

In an embodiment, a self-tightening nut comprises a nut, a motorized thread within the nut, the motorized thread being configured to rotate in order to tighten the nut to an external mechanical component, a controller, the controller configured to rotate the motorized thread, and a power supply for the controller.

In an embodiment, the self-tightening nut comprises a charger for the power supply. In another embodiment, the charger is a wireless charger. In another embodiment, the charger is a solar charger.

In an embodiment, the controller is configured to monitor the tightness of the nut to the external mechanical component, and is further configured to maintain a level of tightness for the nut to the external mechanical component. In yet another embodiment, the controller is configured to lock the motorized thread. In yet another embodiment, the controller is configured to provide a predetermined level of torque. In yet another embodiment, the controller is configured to provide a configurable level of torque.

In an embodiment, a self-tightening bolt comprises a motorized bolt, the motorized bolt being configured to rotate in order to tighten an external thread, a controller, the controller configured to rotate the motorized bolt, and a power supply for the controller.

In another aspect, a charger is provided for the power supply. In yet another aspect, the charger is a wireless charger. In yet another embodiment, the charger is a solar charger.

In another aspect, the controller is configured to monitor the tightness of the bolt to an external mechanical component, and is further configured to maintain a level of tightness for the nut to the external mechanical component. In yet another aspect, the controller is configured to lock the bolt. In yet another aspect, the controller is configured to provide a predetermined level of torque. In yet another aspect, the controller is configured to provide a configurable level of torque.

In yet another aspect, the bolt is threaded or has geared teeth.

Figure 1:
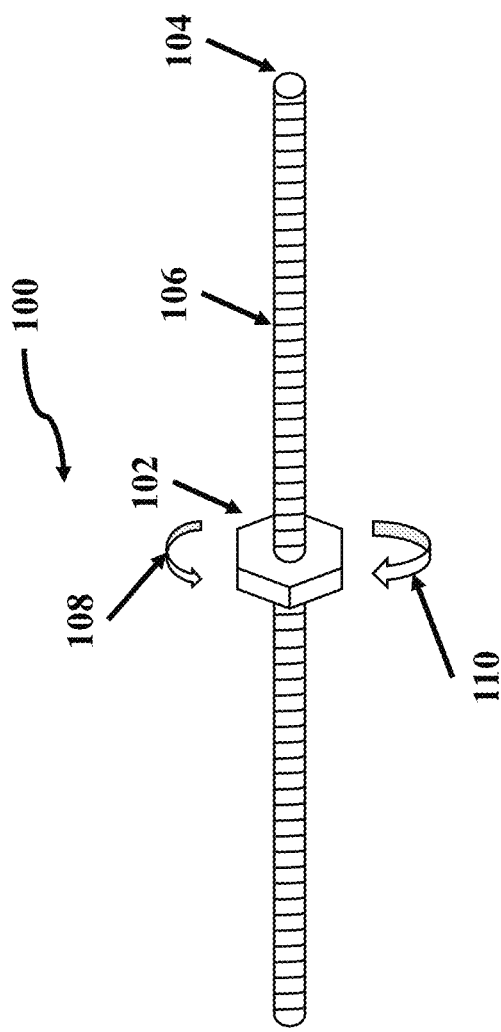
FIG. 1 illustrates a common nut and bolt system.

While embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The present disclosure generally relates to mechanical and computer systems and, more specifically, to a self-tightening or loosening nut or bolt. Provided is a system for a nut, which can apply the proper amount of torque to tighten or loosen itself from a bolt. The nut can come equipped with a micro-controller, which can have the nut apply a certain amount of torque based on certain preconditions. The power to apply a torque can come from a solar powered source, or wirelessly.

FIG. 1 illustrates a common nut and bolt system 100. A nut 102 is illustrated on a bolt 104 having threads 106. As can be appreciated, the nut 102 can be torqued in one direction 108 or another 110 to move the nut 102 across the bolt's 104 threads 106.

Figure 2:
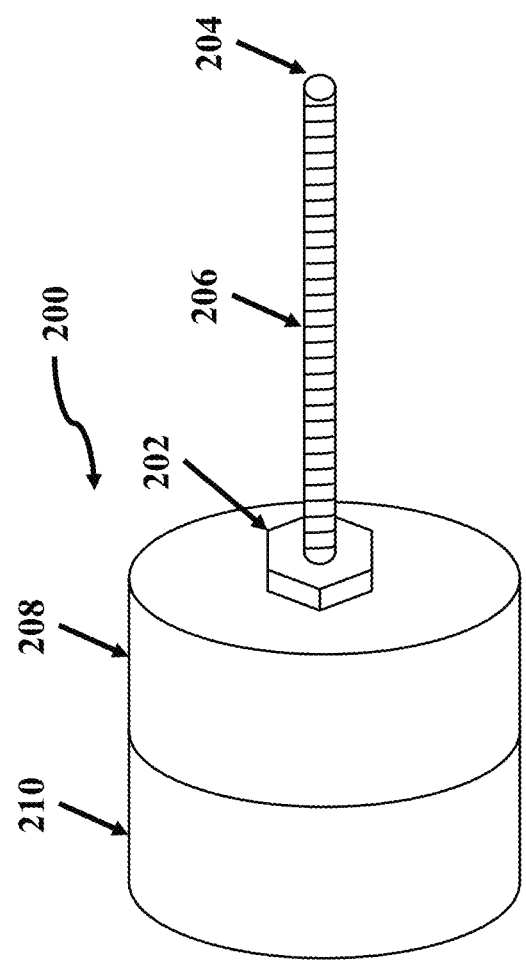
FIG. 2 illustrates a nut attaching components together.

As shown in FIG. 2, a nut 202 can be torqued to move across a bolt's 104 threads 106 to tighten. As shown in FIG. 2, this can be used to tighten a first mechanical piece 208 to a second mechanical piece 210.

The mechanical pieces are shown as cylinders, but this is done for demonstrative purposes only. This type of attachment of tightening a nut, or nut-like structure, to attach two pieces of material together is widely practiced in mechanical systems. It should be understood that the present disclosure relates to any type of mechanical system.

As shown in FIG. 2, if the nut 202 becomes a little loose, it can cause vibrations, and potential damage to the first mechanical piece 208 or the second mechanical piece 210. In the art, some of these mechanical pieces are attached to very expensive machinery that can, often, become prohibitively expensive to replace if damaged.

Figure 3:
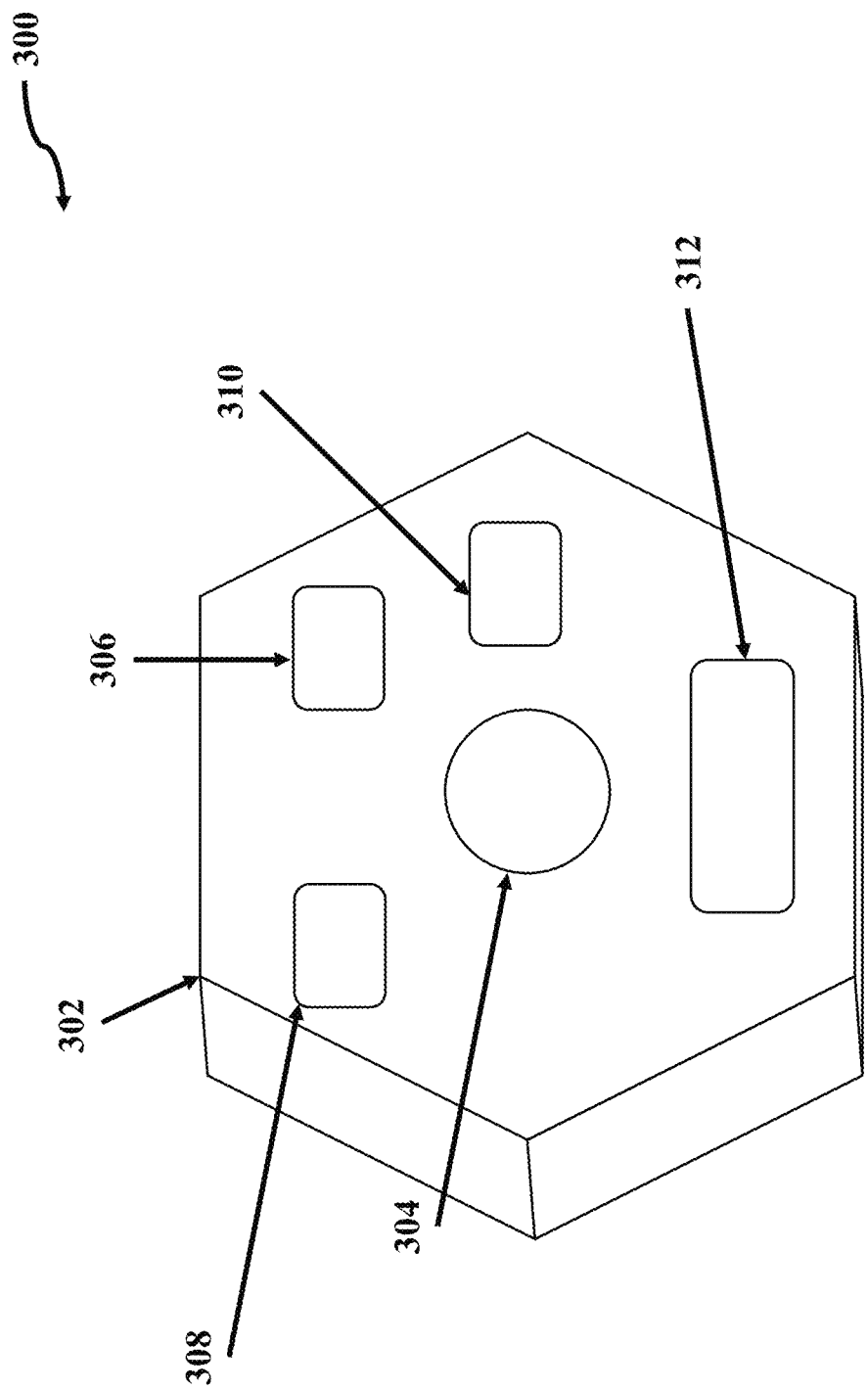
FIG. 3 illustrates a self-tightening nut.

FIG. 3 illustrates a self-tightening nut 300 which has a nut 302. The size and shape of the nut 302 is provided merely as illustrative. Given that this nut 302 is self-tightening, it should be understood that it can be any shape, and does not necessary require that it be shaped for a standard wrench.

The nut 302 has a motorized thread 304 that allows the nut 302 to be removably attached to a bolt. The motorized thread 304 rotates in two separate directions in order to loosen or tighten the nut 302. It should be understood that the nut 302 has some mechanical attachment, such as a post, that would prevent the nut 302 to remain in a fixable direction as the motorized thread 304 rotates. It should be understood that the nut 302 has an internal motor and gear system 306 to rotate the motorized thread 304.

The motorized thread is controlled via a controller 308, such as a RISC processor, or any type of controller known in the art. The processor is configured to apply a certain level of torque to tighten the nut 302. The controller is configured to determine if the nut 302 has become loosened by monitoring the motorized thread 304, to determine if it has been turned. Further, the controller 308 can be connected to certain sensors 310, such as vibration sensors, to determine if the nut needs to be tightened.

The nut 302 requires power to run the controller 308, and is equipped with a power source 310. The power source can be a battery. Overtime, the power source 310 can lose its power and, in an embodiment, the nut 302 comes with a charger 310. The charger can be a solar panel, wireless charger, e.g., inductive charger, or can be a connection point that is connected to an external power source that can exist on the motor or machine that the nut 302 is being attached to.

In an embodiment, the motorized thread 304 can be configured to lock, so that the nut 302 can operate as a normal nut. This can optimally be done as a fail-safe, when an error to the system occurs. It can further be a settable operation, so that an operator can provide maintenance.

It should be understood that the torque parameters can be preprogrammed, preconfigured, or can be updated or configured. For instance, a certain mechanical attachment may require a different level of torque or tightness depending on external temperatures or seasons. Further, machines may require different levels of tightness based on the type of job they are doing, or the manner in which they are desired to be run in.

In this manner, it should be understood that the nut 302 can self tighten to keep two separate mechanical pieces together. It provides stable connection between two metal pieces, where the tightness is controlled. This prevents a nut from being under tightened, over tightened, or from coming loose.

An up-front investment in a self-tightening nut can save repair and maintenance costs in the future. For high cost machines, or high priority connection points, e.g., pipes in remote areas, the self-tightening nut can provide significant savings over time.

The above demonstrates the tightening mechanism as part of the nut. However, it should be understood that the same tightening mechanism can be applied to the bolt.

Figure 4:
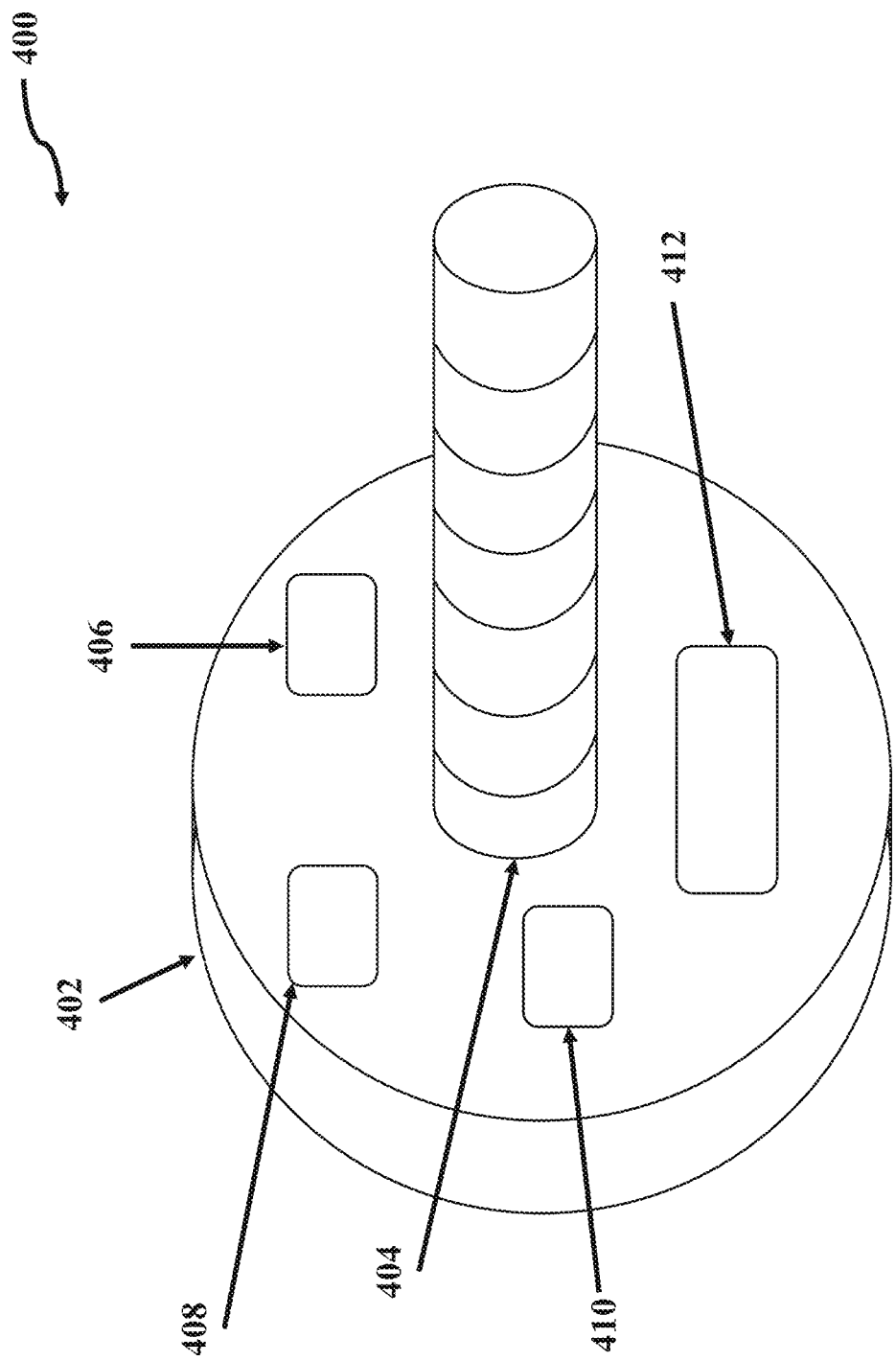
FIG. 4 illustrates a self-tightening bolt.

Shown in FIG. 4 is a self-tightening mechanism 400 as applied to a bolt. The mechanisms of FIG. 4 are similar to that of FIG. 3 but instead of a motorized thread 304 is a motorized bolt 404. The motorized bolt 404 is configured to turn to tighten or loosen a connection to a threaded nut (or threaded section in a mechanical piece) much in the same manner as depicted in FIG. 3.

FIG. 4 illustrates a casing 402. The casing 402 can be welded onto a mechanical piece, or can integrally be made as part of that piece. FIG. 4 illustrates an internal motor and gear system 406 to rotate the motorized bolt 404, which is controlled via a controller 408, such as a RISC processor, or any type of controller known in the art. The processor is configured to apply a certain level of torque to rotate the motorized bolt 404. The controller is configured to determine if the connection between the casing 402 and an external component has become loosened by monitoring the motorized bolt 404, to determine if it has been turned. Further, the controller 408 can be connected to certain sensors 410, such as vibration sensors, to determine if the motorized bolt 404 needs to be rotated in either direction.

The controller 408 requires power, and is equipped with a power source 410. The power source can be a battery. Over time, the power source 410 can lose its power and, in an embodiment, a charger 410 is provided. The charger can be a solar panel, wireless charger, e.g., inductive charger, or can be a connection point that is connected to an external power source that can exist on the motor or machine that the casing 402 is being attached to.

Figure 5:
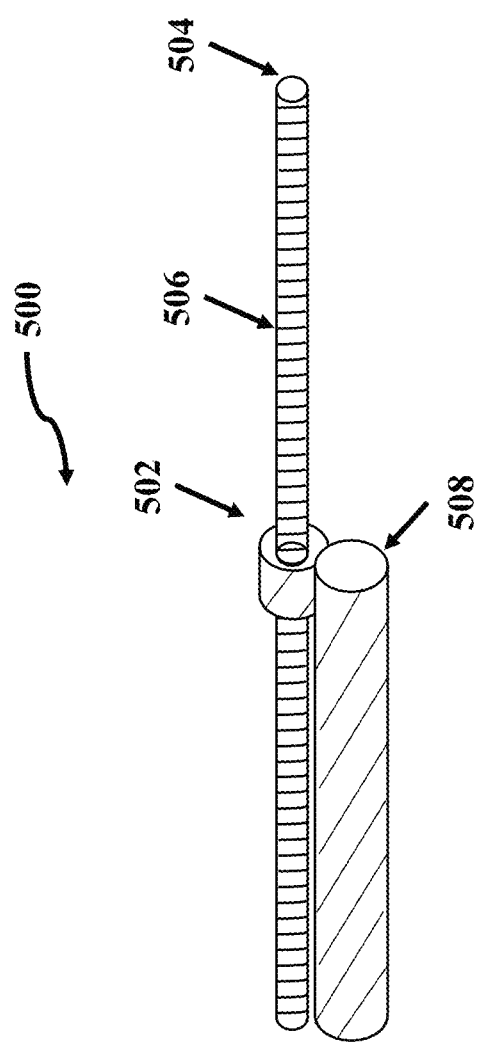
FIG. 5 illustrates a geared nut system.

FIG. 5 illustrates a geared nut system 500. While FIG. 4 illustrated the bolt being motorized, it should be understood that the system type of system as FIG. 4 can be used to rotate a gear 508 instead of the bolt. This can be done to rotate a geared nut 502 across a bolt 504 having thread 506. It should be understood that the nut of this embodiment has threads, or sprockets, that allows it to be torqued through an external gearing mechanism. It should be understood that it otherwise acts as a traditional nut.

The gear 508 would rotate according to the same mechanisms as illustrated in FIG. 4, using a like-system. It should be understood that the gear 508 can be a series of gears and sprockets.

Figure 6:
FIG. 6 illustrates a flow-chart for tightening the nut.

FIG. 6 illustrates a flow-chart for tightening a nut. In step 600, a microcontroller determines the level of tightness needed. This can be provided via a pre-programmed value, or can be configured during use. In step 602, the microcontroller sends an instruction to apply a predetermined level of torque. This tightens the nut. In step 604, the torque is tightened until a certain level of tightness is reached.

Figure 7:
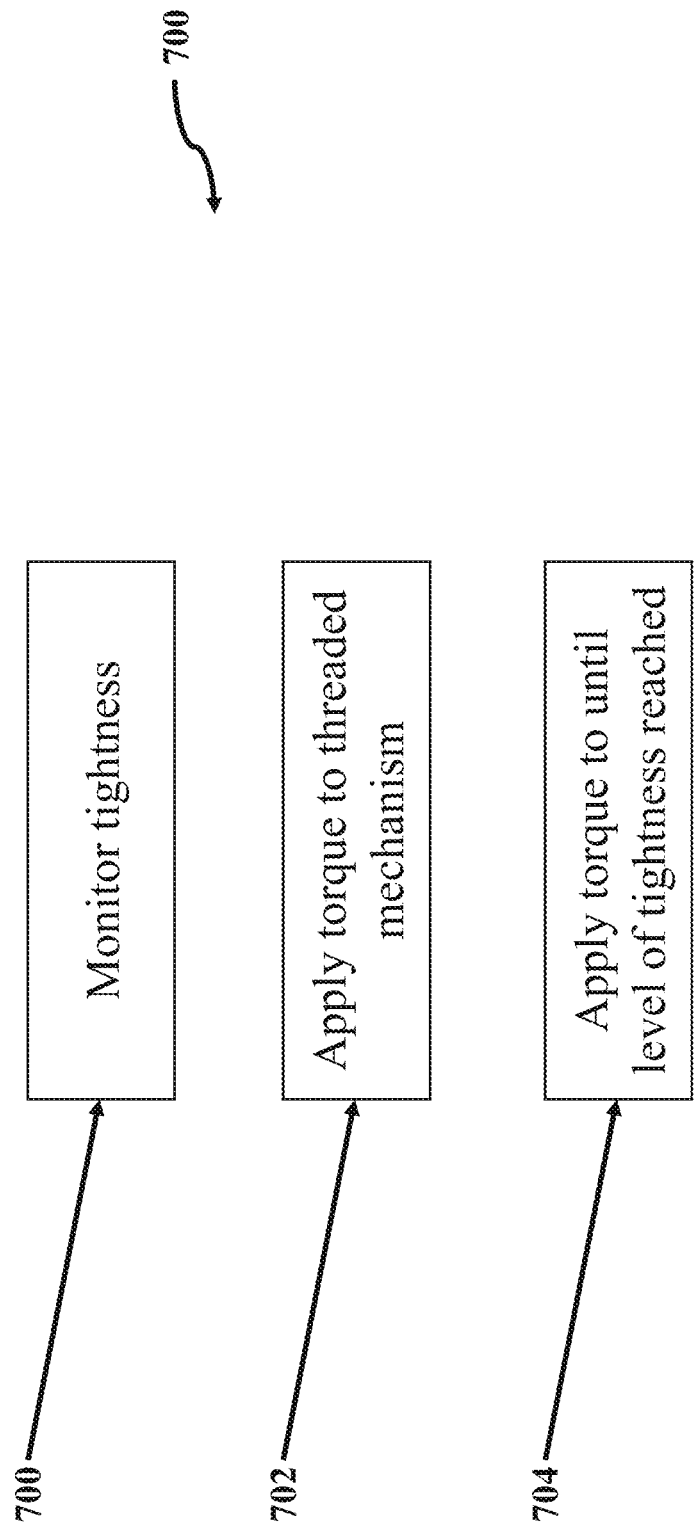
FIG. 7 illustrates a flow-chart for monitoring the nut.

FIG. 7 illustrates a flow-chart for monitoring tightness. In step 700, a microcontroller monitors tightness. In an embodiment, this can be done by determining how many revolutions a nut or bolt has made in either direction. In another embodiment, this can be determined via external sensor that provides vibration readings. In step 702, torque is applied to tighten or loosen the nut according to the predetermined tightness level. In an embodiment, the tightness profile is configurable during use or predetermined. In step 706, the microcontroller applies torque until the predetermined tightness is reached.

This disclosure describes various embodiments in various forms. It should be understood that although a nut and bolt have been shown, it should be understood that any type of shape or form could be applied. It should be understood that the functionality can be provided integrally within a mechanical component. For example, instead of the nut, the threaded component can be internal to the mechanical component to be attached. The same should be understood for the bolt.

Further, it should be understood that although certain threads, gears, and sprockets have been discussed, any type of like mechanism can be used.

It should further be understood that the disclosure is applicable to any type of mechanical system where components need to be attached. This can be done for heavy machinery, large vehicles, and the like. It should also be understood that the same concepts can be applied to many other types of materials, such as plastics.

Although discussed in context of providing tight attachment, it should be understood that the present disclosure can be applied to provide tightening to components that are brittle and can break if overtightened.

While this document contains many specifics, these should not be construed as limitations on the scope of the invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

What is claimed is:

1. A self-tightening nut comprising:
    a nut;
    a motorized thread within the nut, wherein the motorized thread is configured to rotate and tighten the nut to an external mechanical component;
    a controller, wherein the controller is configured to rotate the motorized thread and determine a number of revolutions that the nut has made in a direction to thereby monitor a tightness of the nut; and
    a power supply for the controller.

2. The self-tightening nut according to claim 1, further comprising a charger for the power supply.

3. The self-tightening nut according to claim 2, wherein the charger is a wireless charger.

4. The self-tightening nut according to claim 3, wherein the charger is a solar charger.

5. The self-tightening nut according to claim 1, wherein the controller is configured to maintain a level of tightness for the nut to the external mechanical component.

6. The self-tightening nut according to claim 1, wherein the controller is configured to lock the motorized thread.

7. The self-tightening nut according to claim 1, wherein the controller is configured to provide a predetermined level of torque.

8. The self-tightening nut according to claim 1, wherein the controller is configured to provide a configurable level of torque.

9. The self-tightening nut according to claim 1, wherein the motorized thread rotates in a first direction that allows the nut to be loosened, and wherein the motorized thread rotates in a second direction that allows the nut to be tightened.

10. The self-tightening nut according to claim 1, wherein the nut includes a motor and a gear system.

* * * * *